(12) United States Patent
Meyer et al.

(10) Patent No.: US 11,565,442 B2
(45) Date of Patent: Jan. 31, 2023

(54) DEVICE AND METHOD FOR IMPREGNATING FIBER STRUCTURES

(71) Applicant: BASF SE, Ludwigshafen am Rhein (DE)

(72) Inventors: Andre Meyer, Lemfoerde (DE); Michael Hasenpatt, Lemfoerde (DE)

(73) Assignee: BASF SE, Ludwigshafen am Rhein (DE)

( * ) Notice: Subject to any disclaimer, the term of this patent is extended or adjusted under 35 U.S.C. 154(b) by 1004 days.

(21) Appl. No.: 16/327,539

(22) PCT Filed: Aug. 4, 2017

(86) PCT No.: PCT/EP2017/069829
§ 371 (c)(1),
(2) Date: Feb. 22, 2019

(87) PCT Pub. No.: WO2018/036790
PCT Pub. Date: Mar. 1, 2018

(65) Prior Publication Data
US 2019/0176365 A1      Jun. 13, 2019

(30) Foreign Application Priority Data
Aug. 24, 2016   (EP) ..................................... 16185545

(51) Int. Cl.
*B29B 15/12*      (2006.01)
*B29C 70/06*      (2006.01)
(Continued)

(52) U.S. Cl.
CPC ............ *B29B 15/125* (2013.01); *B29C 70/06* (2013.01); *B29C 70/16* (2013.01); *C08J 5/243* (2021.05);
(Continued)

(58) Field of Classification Search
CPC ....... B29B 15/125; B29C 70/06; B29C 70/16; D06B 15/085; D06B 21/02; D06B 23/023; D06B 3/02; D06B 3/10
See application file for complete search history.

(56) References Cited

U.S. PATENT DOCUMENTS

| | | | |
|---|---|---|---|
| 2,433,965 A | 1/1948 | Upson | |
| 2,969,579 A | 1/1961 | Ball | |

(Continued)

FOREIGN PATENT DOCUMENTS

| | | |
|---|---|---|
| CN | 1919587 A | 2/2007 |
| CN | 102473903 A | 5/2012 |

(Continued)

OTHER PUBLICATIONS

English translation of the International Search Report for International Application No. PCT/EP2017/069829, dated Oct. 24, 2017, 3 pages.

(Continued)

*Primary Examiner* — Yunju Kim
(74) *Attorney, Agent, or Firm* — Armstrong Teasdale LLP

(57) ABSTRACT

An apparatus for impregnating fiber structures with a matrix material includes a lower part having a bath for receiving the matrix material and a draining unit. The draining unit includes a wiper having a wiping edge, over which the impregnated fiber structure is guided during operation, and a surface inclined in the direction of the bath, by which matrix material draining from the fiber structure can return into the bath. The draining unit includes a cover on which a deflection unit, by which the fiber structure is pressed into the bath when the cover is mounted, is mounted. When the cover is mounted, a gap is formed between the cover and the lower part on the sides by which the fiber structure is guided into the apparatus and emerges from the apparatus. A (Continued)

method for impregnating fiber structures with a matrix material is also disclosed.

17 Claims, 4 Drawing Sheets

(51) Int. Cl.
| | | |
|---|---|---|
| *B29C 70/16* | (2006.01) | |
| *C08J 5/24* | (2006.01) | |
| *D06B 3/02* | (2006.01) | |
| *D06B 15/08* | (2006.01) | |
| *D06B 23/02* | (2006.01) | |
| *D06B 3/10* | (2006.01) | |
| *D06B 21/02* | (2006.01) | |

(52) U.S. Cl.
CPC ............... *C08J 5/244* (2021.05); *C08J 5/246* (2021.05); *D06B 3/02* (2013.01); *D06B 15/085* (2013.01); *D06B 23/023* (2013.01); *B32B 2260/021* (2013.01); *C08J 2363/00* (2013.01); *C08J 2363/10* (2013.01); *C08J 2367/06* (2013.01); *C08J 2375/04* (2013.01); *D06B 3/10* (2013.01); *D06B 21/02* (2013.01); *D10B 2101/06* (2013.01); *D10B 2101/12* (2013.01); *D10B 2331/021* (2013.01)

(56) References Cited

U.S. PATENT DOCUMENTS

| | | | |
|---|---|---|---|
| 3,769,126 A | | 10/1973 | Kolek |
| 3,849,154 A | | 11/1974 | Michael et al. |
| 4,267,007 A | | 5/1981 | Kellogg |
| 4,570,566 A | * | 2/1986 | Long ..................... B29C 55/026 118/223 |
| 4,643,126 A | * | 2/1987 | Wilkinson ............ B29B 15/125 118/410 |
| 4,737,383 A | | 4/1988 | Matsumae et al. |
| 4,919,739 A | * | 4/1990 | Dyksterhouse ......... B29C 70/54 427/195 |
| 4,937,028 A | | 6/1990 | Glemet et al. |
| 5,084,305 A | | 1/1992 | Marttila |
| 5,104,698 A | * | 4/1992 | Hayashi ................. D21H 23/42 427/365 |
| 5,747,075 A | | 5/1998 | Gauchel |
| 5,766,357 A | | 6/1998 | Packer et al. |
| 7,413,623 B2 | | 8/2008 | Raday |
| 2012/0156378 A1 | | 6/2012 | Lazzara |
| 2014/0027944 A1 | * | 1/2014 | Tibor .................... B29B 15/122 425/114 |
| 2014/0191437 A1 | | 7/2014 | Johnson et al. |
| 2020/0299896 A1 | * | 9/2020 | Ronchi .................... D06B 3/06 |

FOREIGN PATENT DOCUMENTS

| | | |
|---|---|---|
| CN | 103687705 A | 3/2014 |
| CN | 103700810 A | 4/2014 |
| CN | 105415697 A | 3/2016 |
| GB | 291485 A | 5/1928 |
| JP | H04148905 A | 5/1992 |
| JP | H06170298 A | 6/1994 |
| JP | 06075868 B | 9/1994 |
| WO | 2003020657 A1 | 3/2003 |
| WO | 2007062516 A1 | 6/2007 |

OTHER PUBLICATIONS

A. Miaris et al., Proceedings of the ASME 2011 Pressure Vessels and Piping Division Conference, PVP2011, Jul. 2011.

* cited by examiner

DEVICE AND METHOD FOR IMPREGNATING FIBER STRUCTURES

CROSS-REFERENCE TO RELATED APPLICATIONS

This application is a U.S. National Phase Application of PCT/EP2017/069829, filed Aug. 4, 2017, which claims the benefit of priority to EP Application No. 16185545.7, filed Aug. 24, 2016, the contents of which are hereby expressly incorporated by reference in their entirety.

The invention is based on an apparatus for impregnating fiber structures with a matrix material, comprising a lower part having a bath for receiving the matrix material and a draining unit.

Fiber composite materials are produced by impregnating fiber structures. Fiber structures impregnated in a bath, in particular endless fibers, may be used in order to produce components, for example tubes, posts or tanks, by the wet winding method. Such an apparatus allows continuous impregnation of the fiber structure, which can then be processed further directly after the impregnation. Conventionally, in the wet winding methods, the impregnated fiber structure is wound to form the end product before the matrix material is cured or solidified. After the winding, the curing or solidification of the matrix material is then carried out to form the finished end product.

In order to impregnate fiber structures, in particular endless fibers, various methods are known, a bath through which the fibers are guided generally being used.

For example, it is known from U.S. Pat. No. 2,433,965 to pass endless fibers through a bath by the fibers being immersed into the bath from above and guided around rollers inside the bath. After leaving the bath, the fibers impregnated in this way are guided through a roll pair in which excess matrix material is squeezed out. To this end, the roll pair lies above the bath surface so that the removed matrix material flows back into the bath.

An apparatus for producing a wound product is known from U.S. Pat. No. 4,267,007. In this case, the fibers are likewise impregnated with the matrix material in a bath before the winding process. To this end, the fibers are passed around a roller inside the bath. The impregnated fibers are subsequently passed over a plate and pressed onto the plate with a block, in order to squeeze out excess matrix material.

However, all methods in which the fiber structure is passed through a bath have the disadvantage that, because of the usually open bath, the viscosity of the matrix material changes with time, either because of evaporation or, depending on the matrix material used, also by chemical reaction because of contact with air humidity. Furthermore, on each start-up, for example after cleaning, it is necessary to feed the fibers in again laboriously. Filling of the bath can only be carried out when the fibers have already been introduced.

Particularly in order to avoid the viscosity of the matrix material changing, methods and apparatuses are known in which the fibers are guided through a gap in which the impregnation is carried out. Such an apparatus is known for example from U.S. Pat. Nos. 4,937,028, 5,766,357 or from WO-A 2007/062516 as well as from A. Miaris et al., "Modeling the Impregnation Process of a Siphon Impregnation System during Filament Winding", Proceedings of the ASME 2011 Pressure Vessels and Piping Division Conference, PVP2011, July 2011. However, these methods have the disadvantage, in particular, that, because of the small size of the impregnation device, the matrix material has to be replenished continuously and very precisely, in order to obtain uniform impregnation.

U.S. Pat. No. 5,747,075 discloses a pultrusion method in which the fibers are guided through channels, into which matrix material for the impregnation is pumped via a distributor.

U.S. Pat. No. 5,084,305 describes an impregnation method in which the fibers are guided over webs in which nozzles, through which the matrix material is applied onto the fibers, are respectively formed. Uniform impregnation is achieved in this system by guiding the fibers along once over a web and once under a web.

In this method as well, continuous and in particular uniform supply of the matrix material is necessary in order to obtain uniformly impregnated fibers.

Another possibility for the impregnation of fibers is known from U.S. Pat. No. 7,413,623. Here, the fibers are guided over a plurality of rolls and the addition of the matrix material is carried out from a storage container, which is arranged above the rolls and from which the matrix material is supplied to a roll gap through which the fibers move from the top downward. Here, it is disadvantageous in particular that excess matrix material flows away downward through the rolls and cannot be recycled. In addition, there is a risk that matrix material will accumulate on the rolls and be cured on the roll surface, which leads to elaborate additional cleaning processes being required.

The object of the present invention was to provide an apparatus for impregnating fiber structures, which does not have the disadvantages known from the prior art.

The object is achieved by an apparatus for impregnating fiber structures with a matrix material, comprising a lower part having a bath for receiving the matrix material and a draining unit, wherein the draining unit comprises at least one wiper having a wiping edge, over which the impregnated fiber structure is guided during operation, and a surface inclined in the direction of the bath, by which matrix material draining from the fiber structure can return into the bath, as well as a cover, on which a deflection unit, by which the fiber structure is pressed into the bath when the cover is mounted, is mounted, a gap respectively being formed, when the cover is mounted, between the cover and the lower part on the sides by which the fiber structure is guided into the apparatus and emerges from the apparatus.

Because of the bath of matrix material, through which the fiber structure is guided for the impregnation, it is not necessary to provide dosing units with which an exact amount of matrix material is supplied. The fibers pick up the matrix material when passing through the bath, and excess matrix material is subsequently wiped off. To this end, the at least one wiper having a wiping edge is provided. The matrix material wiped off drips onto the surface inclined in the direction of the bath, so that the excess matrix material wiped off runs back into the bath via the inclined surface and can thus be reused.

The cover, with which the apparatus is closed, prevents constant air exchange from taking place above the bath. In this way, on the one hand, the evaporation of the matrix material can be restricted, and on the other hand the constant supply of fresh air is also prevented so that a reaction of the matrix material with the water contained in the air is retarded. The matrix material contained in the bath can therefore be used for a longer time and needs to be replaced less often because of aging occurring and a resulting increase in the viscosity. In order to prevent the fibers from being damaged when entering the apparatus or when leaving the apparatus, and furthermore to prevent the matrix material from being squeezed out of the fibers when leaving the apparatus, a gap through which the fibers are guided into the apparatus is provided between the cover and the lower part, as well as a second gap through which the impregnated fibers leave the apparatus.

By the deflection part mounted on the cover, the fiber structure is pressed into the matrix material in the bath during operation. In this way, it is possible to fill the bath independently of the introduction of the fibers. The fibers can be introduced straightforwardly above the surface of the bath and are then pressed into the bath by the deflection part when the cover is mounted. Complicated introduction with the bath empty is therefore avoided.

Another advantage of the apparatus according to the invention is that, because of the structure with the deflection unit on the cover, the lower part can easily be removed for cleaning and replaced with a new lower part. In this way, long operating interruptions during cleaning are not required. If the cleaning outlay is too great, or is possible only with environmentally harmful means, so that disposal can be carried out more favorably and in a more environmentally friendly manner, the apparatus according to the invention also makes it possible to configure lower parts as disposable parts, and respectively to replace a lower part with a new one when required.

In order to wipe the fibers uniformly after passing through the bath, it is preferred that, in addition to the at least one wiper over which the impregnated fiber structure is guided during operation of the apparatus, at least one wiper, which presses from above with a wiping edge on the impregnated fiber structure when the cover is mounted, is mounted on the cover. With the at least one wiper mounted on the cover, the excess matrix material is also wiped off from the upper side of the fibers. This also drips from the wiper onto the surface inclined in the direction of the bath, from which the matrix material flows back into the bath. By the mounting of the wiper on the cover, it is here again possible to introduce the fiber structure straightforwardly into the apparatus via the parts mounted on the lower part. The parts acting from above then press correspondingly on the fiber structure after mounting of the cover. Elaborate insertion between the individual wipers and deflection parts is not necessary.

So that the pressure acting on the fiber structure can be adjusted, it is furthermore preferred that at least one wiper mounted on the cover is height-adjustable. It is particularly preferred that all wipers mounted on the cover are height-adjustable. If a plurality of wipers, which are mounted on the cover, are provided it is possible to adjust each wiper individually. This allows guiding by the wipers mounted on the lower part and on the cover, in such a way that a desired amount of matrix material remains in the fiber structure. The greater the distance between the wiping edge of the wiper mounted on the cover and the cover is, the greater is the pressure which acts on the impregnated fiber structure, and commensurately more matrix material is wiped off. Thus, if a fiber structure with a great deal of matrix material is intended to be obtained, the wipers will be adjusted in such a way that only a small pressure acts on the fiber structure, but when only a small proportion of matrix material is intended to be contained in the fiber structure, the wipers will instead be adjusted in such a way that a higher pressure acts on the fiber structure.

In order to wipe the matrix material uniformly off from the fiber structure, it is furthermore preferred that the wipers on the cover and on the lower part are arranged offset with respect to one another in the feed direction of the fiber structure. It is particularly preferred in this case that, respectively in alternation in the feed direction of the fiber structure, one wiper is arranged on the cover and one on the lower part. By such an arrangement, the fiber structure is guided along uniformly from above and below at the wipers and the matrix material is wiped off. An alternating arrangement of the wipers on the lower part and on the cover furthermore leads to the wipers mounted on the cover respectively interleaving between the wipers mounted on the lower part. This has the further positive effect that, in the event of a height adjustment of the wipers on the cover, the same pressure acts on the fiber structure which passes the wiping edge of the wiper mounted on the cover as at the neighboring wiping edge of the wiper mounted on the lower part. In this way, uniform impregnation of the fiber structure is obtained.

So that the excess material is wiped off from the fiber structure, it is particularly advantageous for the wipers on the lower part and on the cover respectively to be dimensioned in such a way that the wiping edge of the wipers on the cover is lower than the wiping edge of the wipers on the lower part of the apparatus. In this way, interleaving of the wipers mounted on the cover between the wipers mounted on the lower part always takes place. How deeply the wipers interleave with one another may then be adjusted by a height adjustment of the wipers mounted on the lower part and/or of the wipers mounted on the cover.

As material for the wipers, abrasion-resistant metal, abrasion-resistant plastic, abrasion-resistant ceramic or glass are suitable in particular. The use of an abrasion-resistant material ensures that no particles abraded from the wiper get into the impregnated fiber structure as extraneous substances. It furthermore prevents the wiping edges from being deformed by abrasion in the course of operation. In this way, a uniform effect of the wipers is achieved throughout the entire operating time. Particularly preferred as material for the wipers are steel, high-density polyethylene (HDPE), polytetrafluoroethylene (PTFE), ceramic or glass.

Abrasion-resistant within the scope of the present invention means that during the passage of 1000 km of the fiber structure, particularly of rovings, less than 0.1 mm of the material of the wiper is removed by the passing fiber structure.

So that the fiber structure is not damaged during introduction into the apparatus, and in particular does not scrape over an edge, it is preferred that a first deflection unit, over which the fiber structure is guided before entering the bath, is provided on the lower part. Correspondingly, a second deflection unit, over which the impregnated fiber structure is guided after leaving the bath, is preferably provided on the lower part. Since the first deflection unit and the second deflection unit are each provided on the lower part, the fiber structure can be placed simply on the deflection units during introduction. By the deflection unit fastened on the cover, the fiber structure is then pressed into the bath so that the fiber structure is guided over the first deflection unit on the lower part, along the deflection unit on the cover and over the second deflection unit on the lower part to the draining unit. The first deflection unit and the second deflection unit on the lower part are in this case placed in such a way that the deflection unit on the cover is positioned between the first deflection unit on the lower part and the second deflection unit on the lower part during mounting.

So as to remove excess matrix material from the fibers already when leaving the bath and before the draining unit, it is furthermore preferred that a wiping roll, which presses the fiber structure onto the second deflection unit when the cover is mounted, is mounted on the cover. The fiber structure is guided through during operation between the second deflection unit and the wiping roll. Since the wiping roll presses on the deflection unit, excess matrix material is already squeezed out of the fiber structure at this position. The positioning of the second deflection unit and of the wiping roll furthermore leads to the excess matrix material flowing back directly into the bath.

The first and the second deflection units may respectively independently of one another be a rod or a rotatable roller. The deflection unit, by which the fiber structure is pressed into the bath, may likewise comprise at least one rod or at least one rotating roller. If the deflection unit is a rod, then it preferably only has rounded edges and is particularly preferably a round rod. Both rods and rotatable rollers may be provided for the deflection elements. It is, however, preferred for at least the first and the second deflection units which are arranged on the lower part to be configured either both as rods or both as rotating rollers. Particularly preferably, all the deflection elements are configured as a rod or all the deflection elements are configured as a rotatable roller.

Suitable materials for the deflection elements are the same as the materials for the wipers. That is to say, the deflection elements are preferably made of abrasion-resistant metal, abrasion-resistant plastic, an abrasion-resistant ceramic or from glass, and are particularly preferably made of steel, HDPE, PTFE, ceramic or glass.

In order to press the fibers into the bath, just one deflection element may be provided on the cover or a plurality of deflection elements may be mounted on the cover. In this case, all deflection elements mounted on the cover are positioned in such a way that they are positioned between the first and second deflection elements on the lower part when the cover is closed and when the deflection elements are present on the lower part.

In order to prevent constant air exchange from taking place through the gaps through which the fibers are guided during operation, and thus water constantly being supplied with the air humidity or matrix material evaporating and being removed from the apparatus, it is preferable for a sealing lip to be provided at the gap through which the fiber structure is guided into the apparatus and/or at the gap through which the fiber structure emerges from the apparatus. The sealing lip here may be made of any desired suitable material, in particular an elastomer material such as is conventionally used seals. The use of the elastomer material ensures that both the not yet impregnated fiber structure is not damaged by the sealing lip when entering the apparatus, and the impregnated fiber structure is not damaged by the sealing lip when leaving the apparatus.

In order to prevent matrix material from being able to react with constituents from the ambient air, particularly water contained in the air, and thereby be cured, it is furthermore preferred for an inlet and an outlet for a flushing gas to be provided. With the flushing gas, the atmosphere above the matrix material can be removed and replaced with the flushing gas. Suitable flushing gases depend on the matrix material used. In the case of matrix materials which react with water, for example, a water-free flushing gas will be used. For example, dry air or a dry inert gas such as nitrogen, carbon dioxide or a noble gas are suitable therefor. Inert gases are also suitable when the matrix material can react with other constituents of air, for example the oxygen contained therein. When, in contrast thereto, the intention is to prevent the matrix material from evaporating, a flushing gas which is saturated with the constituents of the matrix material that can evaporate may, for example be used.

In order to produce a component, a method which comprises the following steps is used:
(a) impregnating a fiber structure with a matrix material in an apparatus as described above,
(b) shaping the impregnated fiber structure to form a component.

The fiber structure to be impregnated is in this case preferably taken from a stock, for example a roller on which the fiber structure is wound. In order to be able to operate the impregnation apparatus suitably, the fiber structure to be impregnated is an "endless structure", that is to say the fiber structure may in principle have an unlimited length and a finite length results only from the necessity that arbitrarily long fiber structures cannot be contained in the stock. Preferably, the fiber structures are then configured in such a way that, when the end of one structure is reached, a subsequent new structure can be connected straightforwardly to the previous structure, for example by knotting when using endless fibers as a fiber structure. Fiber structures which may be impregnated are, for example, nonwovens, fabrics, knits, individual fibers or rovings.

It is preferred for the fiber structure to comprise rovings. These are particularly preferably wound in a wet winding method to form a component after the impregnation in step (b). Components which can be produced in this way by the method according to the invention are, for example, tubes, posts or tanks of any type and size.

In order to obtain a sufficient strength of the component, it is furthermore preferred for the fiber structure to contain carbon fibers, glass fibers, aramid fibers, synthetic fibers, for example polymer fibers or natural fibers. The fiber structure may in this case contain different fibers. The selection of the fibers is dictated, in particular, by the mechanical requirements for the component. It is, however, conventional not to use different fibers, but only fibers of one material. Particularly preferably, the fiber structure contains carbon fibers, glass fibers or aramid fibers.

The matrix material with which the fibers can be impregnated may be any desired thermoplastic polymer or contain reactants for the production of a thermosetting or thermoplastic polymer, in which case the reactants must be present in liquid or dissolved form. If the matrix material is a thermoplastic polymer, then this is for example present as a melt. As an alternative, however, it is also possible for the matrix material to contain reactants for production of the polymer in the form of a monomer solution, oligomer solution, monomer melt or oligomer melt, which then react to form the desired polymer. If the fiber structure is intended to be impregnated with a thermosetting polymer, the matrix material always contains reactants for production of the desired thermosetting polymer. In addition, the matrix material may contain conventional catalysts. Reactants for production of the polymer are generally monomers or oligomers of which the polymer is made up. If a thermosetting polymer is intended to be produced, the reactants may also already be present as polymers which react further to form the thermoset.

In order to adjust the properties of the component, the matrix material may furthermore contain additives. These are for example plasticizers, impact strength modifiers, UV stabilizers, flame retardants, and any other desired additives known to the person skilled in the art which are conventionally used for the modification of polymers.

Particularly preferably, the matrix material is selected from unsaturated polyester resins (UP), vinyl esters (VE), epoxy resins (EP) and polyurethanes (PUR), and reagents thereof.

Exemplary embodiments of the invention are represented in the figures and will be explained in more detail in the description below.

FIG. 1 shows a wet winding method, in which the apparatus according to the invention for impregnating a fiber structure may be used, in an outline representation.

Figure 1:
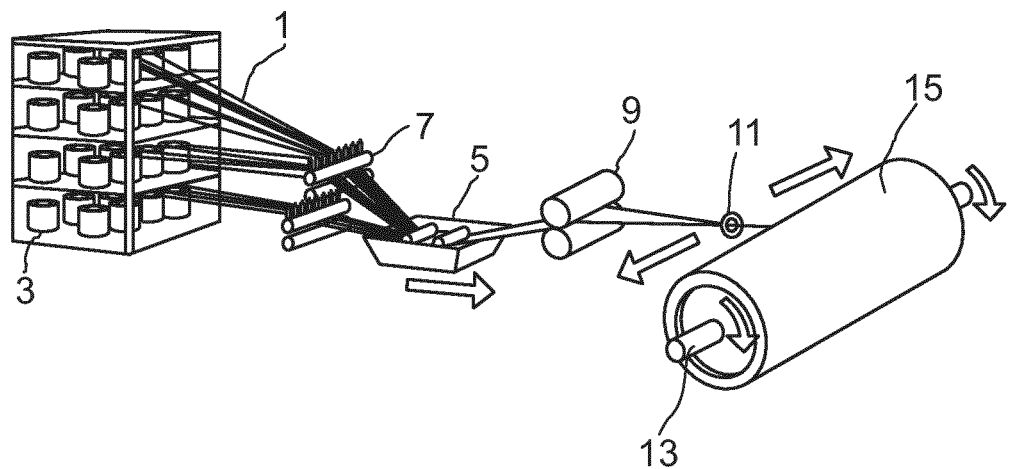
FIG. 1 shows an outline representation of a wet winding method.

In order to produce components by a wet winding method, a fiber structure 1, in the embodiment represented here rovings, is supplied from a stock 3, here a creel, to a bath 5. Before entering the bath 5, the rovings are guided through combs 7, in which the rovings are separated from one another so that they come in contact with the matrix material all around in the bath 5 and thus are impregnated uniformly. The bath 5 is followed by a wiping roll pair 9, through which the rovings impregnated in the bath 5 are guided. At the wiping roll pair 9, excess matrix material is removed from the impregnated rovings. Subsequently, the impregnated rovings are guided through a guide ring 11 and wound onto a spindle 13. In this way, a rotationally symmetrical component 15 is produced. In order to obtain uniform winding of the impregnated rovings 1 on the spindle 13, the guide ring 11 is mobile and can be moved parallel to the axis of the spindle 11, as represented here by arrows.

Figure 2:
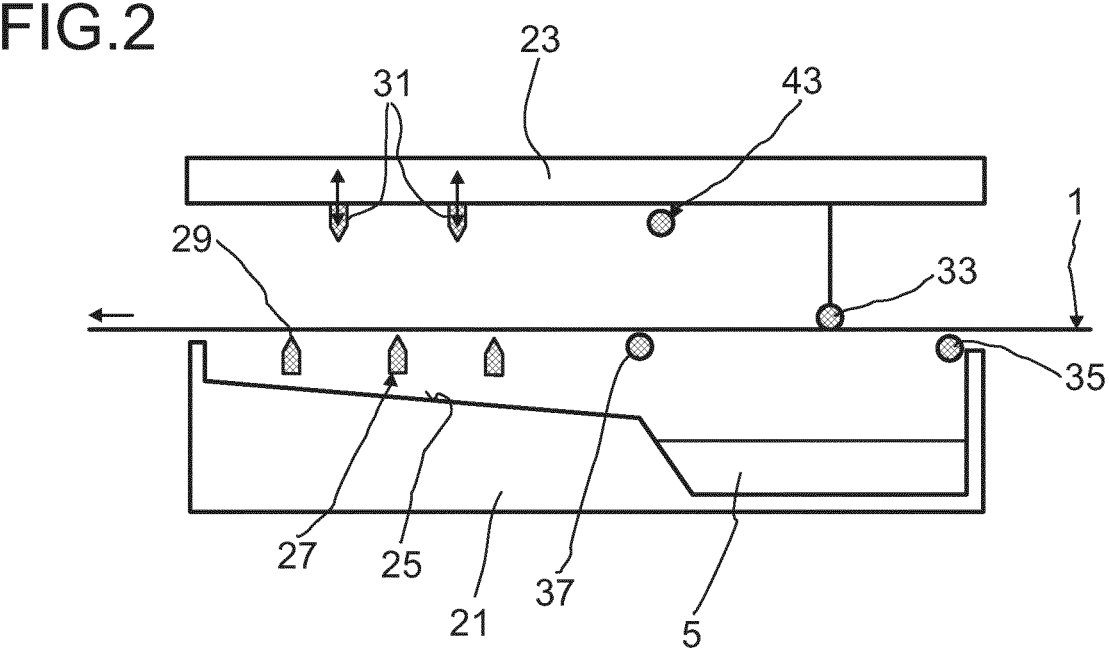
FIG. 2 shows a sectional view of an apparatus according to the invention for impregnating a fiber structure, with the cover open.

An apparatus according to the invention for impregnating a fiber structure is represented in a sectional view in FIG. 2.

An apparatus in which the fiber structure 1, for example the rovings, can be impregnated with matrix material comprises a lower part 21 and a cover 23. In the lower part 21, there is the bath 5 of the matrix material with which the fiber structure 1 is intended to be impregnated. In the movement direction of the fiber structure 1, the bath 5 is followed by a surface 25 inclined in the direction of the bath. Wipers 27, respectively having a wiping edge 29, are arranged above the inclined surface 25 on the lower part 21. During continuous operation, the fiber structure 1 is guided over the wiping edge 29 and excess matrix material is removed from the fiber structure 1. Because of the positioning of the wipers 27 above the inclined surface, the matrix material wiped off flows back into the bath 5.

Figure 3:
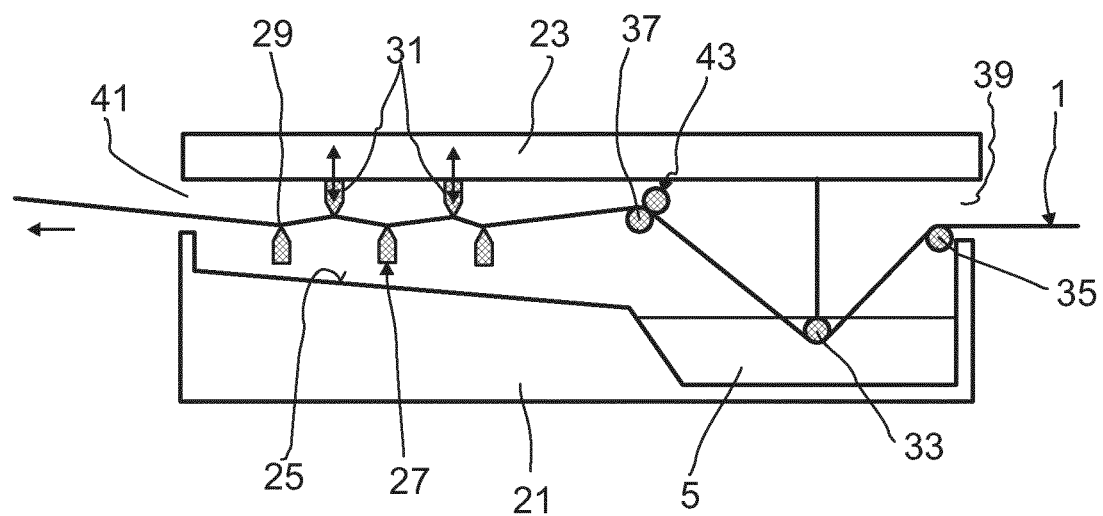
FIG. 3 shows a sectional representation of the apparatus according to FIG. 2 with the cover closed.

Wipers 31, which are preferably height-adjustable, are fitted on the cover 23. The wipers 31 on the cover 23 are in this case preferably positioned in such a way that they interleave between the wipers 27 on the lower part 21. A deflection unit 33, by which the fiber structure 1 is pressed into the bath 5 when the cover 23 is closed, is furthermore mounted on the cover 23. This is represented in FIG. 3. Here, it can also be seen that the wipers 27 that are fastened on the lower part 21 interleave between the wipers 31 which are mounted on the cover 23. In this way, a slightly zigzagged path is imparted to the fiber structure 1.

So that the fiber structure 1 is not damaged at edges on the lower part before entering the bath 5 and after leaving the bath 5, in the embodiment represented here a first deflection unit 35 and a second deflection unit 37 are provided on the lower part 21. During operation, the fiber structure 1 passes through a gap 39 between lower part 21 and cover 23 in the apparatus for impregnating fibers, and is guided over the first deflection unit 35 on the lower part 21. Subsequently, the fiber structure 1 passes along the deflection unit 33, which is mounted on the cover 23 and by which the fiber structure 1 is immersed in the bath 5. The deflection unit 33 is followed by the second deflection unit 37, over which the fiber structure 31 is guided before it is delivered to the wipers 27, 31 at which the excess matrix material is removed. The impregnated fiber structure then leaves the apparatus through a second gap 41 and may be delivered to further processing, for example the spindle 13 of a wet winding method. As an alternative to components which are produced by the wet winding method, however, any other desired components, for example even flat components, may also be produced from the impregnated fiber structure. To this end, for example, it is possible to cut the impregnated fiber structure to a desired length and shape it to form the desired component in a suitable mold, particularly when it is a nonwoven, a knit or a fabric. However, delivery to a spindle 13 of a wet winding method is preferred.

As a result of the immersion of the fiber structure 1 in the bath 5, large amounts of matrix material generally adhere to the fiber structure 1 when it leaves the bath 5. In order to remove a first excess of matrix material, it is preferred—as represented here—for a wiping roll 43, which bears on the second deflection unit 37 when the cover 23 is closed, to be contained. The impregnated fiber structure is then guided through between the second deflection unit 37 and the wiping roll 43.

By adjusting the height of the wipers 31 mounted on the cover 23, it is possible to adjust the pressure with which the wipers 27, 31 act on the impregnated fiber structure 1. It is thereby possible to adjust in a controlled way how much matrix material the impregnated fiber structure 1 should contain. In the case of a higher pressure, which is achieved by the wipers 31 fastened on the cover 23 interleaving more deeply between the wipers 27 on the lower part 21, more matrix material is squeezed out of the impregnated fiber structure 1 so that, overall, the latter contains less matrix material than in the case of adjustment of the wipers 31 such that they interleave less deeply between the wipers 27 on the lower part 21 and the pressure on the fiber structure is therefore less.

Both the deflection unit 33 mounted on the cover 23 and also the first deflection unit 35 and the second deflection unit 37 on the lower part 21 may respectively independently of one another be configured in the form of a rod or as a rotatable roller. When a deflection unit 33, 35, 37 is configured as a rod, it preferably has only rounded edges at least in the region in which contact with the fiber structure 1 takes place, and is in particular a round rod.

The wipers 27, 31 used may have any desired shape known to the person skilled in the art for wipers. The wipers may also be oriented in a direction other than at 90° to the fiber structure 1. With this form and orientation of the wipers, it is merely necessary to take care that the impregnated fiber structure 1 is not damaged thereby. The wipers may in this case be configured and oriented as is already currently conventional in the case of baths for the impregnation of fiber structures.

Figure 4:
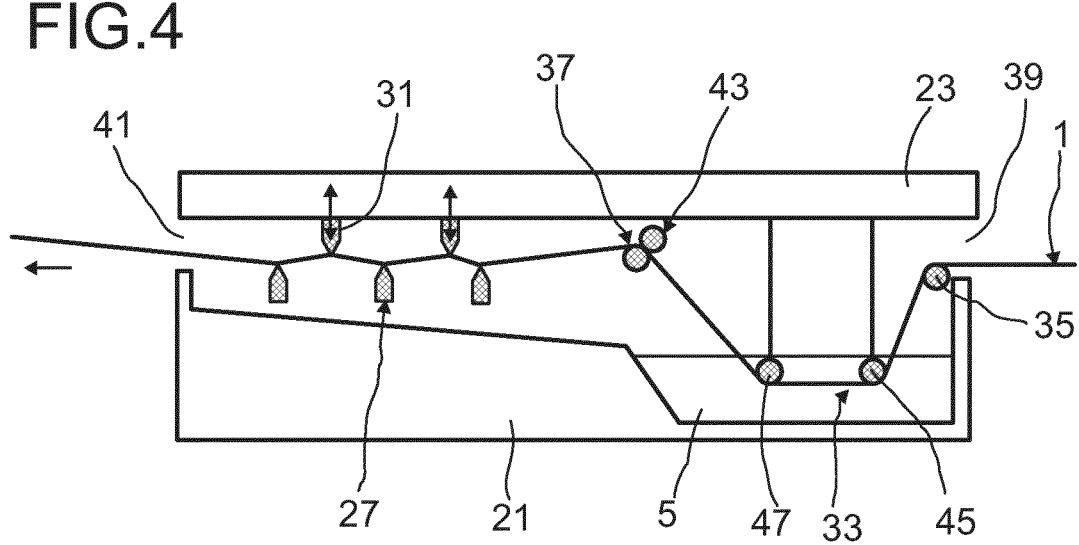
FIGS. 4 to 7 show sectional views of various embodiments of an apparatus according to the invention.
Figure 5:
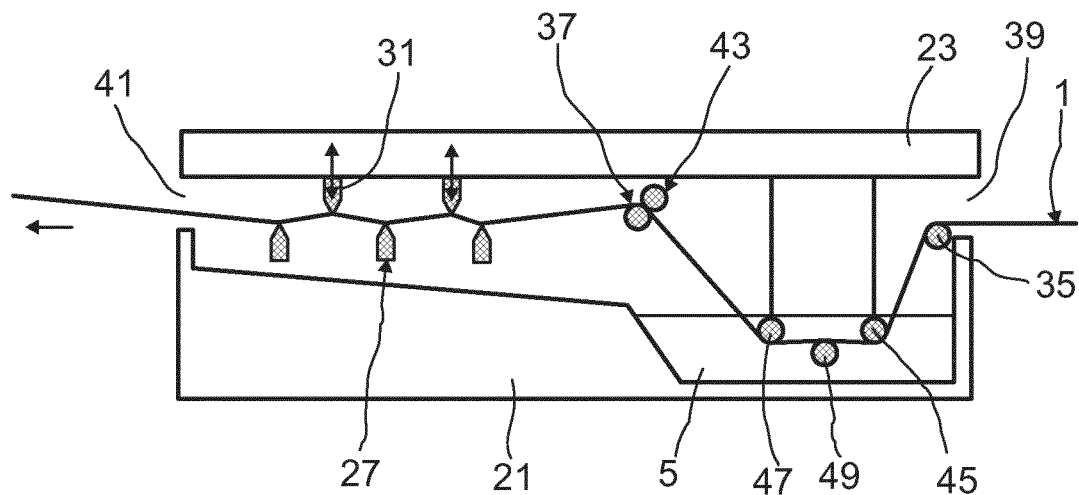
Figure 6:
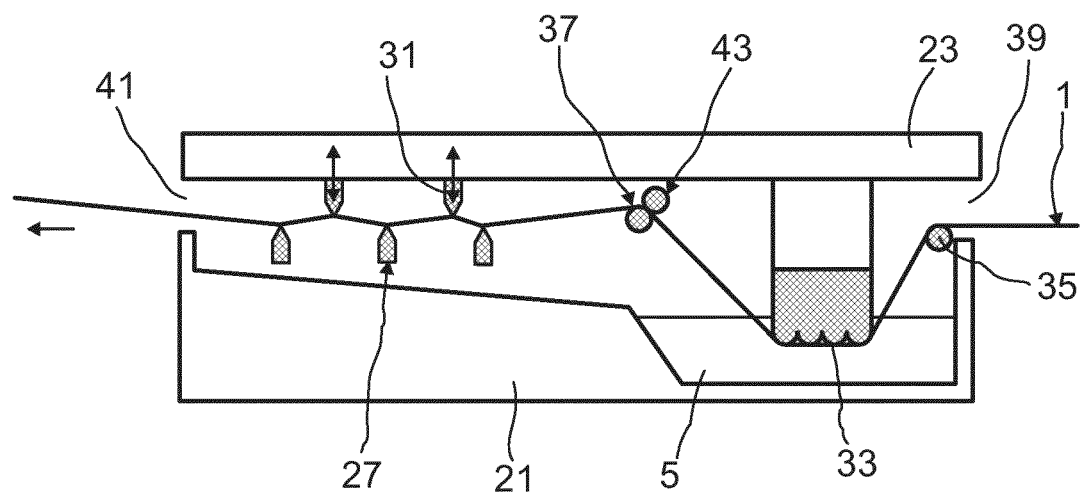

FIGS. 4 to 6 represent alternative embodiments of the configuration of the deflection unit 33 mounted on the cover 23. The rest of the structure of the apparatus for impregnating fiber structures corresponds to that of the embodiment represented in FIGS. 2 and 3.

In the embodiment represented in FIG. 4, the deflection unit 33 comprises a first deflection unit 45 mounted on the cover 23 and a second deflection unit 47 mounted on the cover 23. Here again, it is possible for the first deflection unit 45 mounted on the cover 23 and the second deflection unit mounted on the cover 23 to be configured as a rod or as a rotatable roller. The position of the first deflection unit 45 mounted on the cover 23 and of the second deflection unit 47 mounted on the cover 23 is such that the two deflection units 45, 47 are positioned between the first deflection unit 35 and the second deflection unit 37 when the cover 23 is closed.

By way of the first deflection unit 45 mounted on the cover 23 and of the second deflection unit 47 mounted on the cover 23, the distance traveled by the fiber structure in the bath 5 can be lengthened, and the residence time of the fiber structure in the bath 5 can therefore be increased for the same speed in comparison with only one deflection unit, as represented in FIGS. 2 and 3.

It is also possible to provide even more deflection units configured as a rotatable roller or a rod on the cover 23, although this is expedient only when they are respectively in contact with the fiber structure 1 and the distance which the fiber structure 1 travels in the bath 5 is lengthened further.

As an alternative to further deflection units on the cover 23, it is also possible to provide an additional deflection unit 49 in the bath 5 in order to lengthen the distance travelled in the bath 5 and optionally also to improve the impregnation. This, as represented in FIG. 5, lies between the first deflection unit 45 mounted on the cover 23 and the second deflection unit 47 mounted on the cover 23. By the additional deflection unit 49 arranged in the bath, the fiber structure is pressed against the deflection units 45, 47 mounted on the cover and, at the same time, also experiences a pressure on the additional deflection unit 49. In this way, particularly when the fiber structure is a nonwoven, fabric or knit, or alternatively when a plurality of fibers are connected to form a roving, matrix material is pressed between the fibers and gas cushions optionally contained between the fibers are squeezed out. In this way, uniform and above all also complete impregnation is achieved.

Besides individual rods or rotatable rollers, as is represented in FIGS. 2 to 5, the deflection unit 33 may also be configured in the form of a die with a structured surface. This is represented by way of example for a deflection unit with a corrugated surface in FIG. 6. The structure of the surface may, however, also have any other desired shape. It is merely necessary to take care that the fiber structure is not damaged by the structure of the surface of the deflection unit 33 configured as a die.

Figure 7:
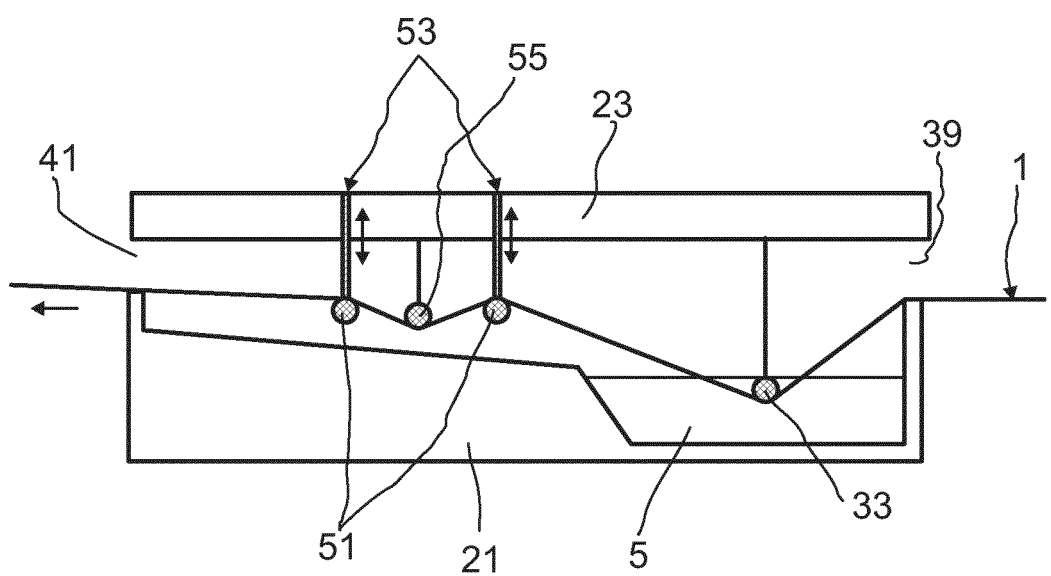

An embodiment with an alternative configuration of the draining unit is represented in FIG. 7.

In contrast to the embodiment represented in FIGS. 2 to 6, here the draining unit is not configured with wipers 27, 31 interleaving in one another.

In the embodiment represented in FIG. 7, deflection units 51 are provided, for example as a rod or rotatable roller, in the draining unit on the lower part 21, and height-adjustable wipers 53 are provided on the cover 23. The fiber structure 1 is guided through between the deflection units 51 and the wipers 53, the fiber structure 1 being pressed against the wipers 53 by the deflection units 51. The wipers 53 can be adjusted in their height, so that they can be pressed against the deflection units 51 with an adjustable pressure. In this way, the amount of matrix material in the impregnated fiber structure can be adjusted. Between the wipers 53, a further deflection unit 55 is mounted on the cover. With this, it is ensured that the fiber structure 1 is pressed against the deflection units 51 even when there is a gap between deflection unit 51 and wiper 53.

In all embodiments, it is possible to provide sealing elements in the region of the gaps 39, 41 through which the fiber structure is guided into the apparatus and the impregnated fiber structure is guided out of the device, respectively, in order to seal the apparatus against ambient air entering. This is advantageous in particular when a polymer or a polymer precursor compound which reacts chemically with an air constituent, for example water contained in the air, is used as the matrix material. In addition, it is possible to provide an inlet and an outlet for a flushing gas, in order to flush the gas space above the bath with the flushing gas.

In all embodiments represented here, the apparatus for impregnating a fiber structure allows simple setting up. Regardless of whether matrix material is or is not already contained in the bath 5, it is possible to position the fiber structure 1 easily with the cover 23 open. By the deflection units and wipers on the cover 23, the fiber structure is pressed against the corresponding deflection units and wipers on the lower part 21 and pressed into the bath 5, and thus follows the intended path. Complicated threading of the fiber structure, or emptying of the matrix material from the bath in order to place the fiber structure around a roll, is therefore not necessary with the apparatus described here. In a corresponding simple way, after switching off, the fiber structure can also be removed again after opening the cover 23.

In addition, when necessary, it is straightforwardly possible by removing and replacing the lower part 21 either to provide a different matrix material or, when necessary, to remove a lower part 21 for cleaning or disposal and replace it with a new lower part 21. In this way, in particular, it is also possible to continue to operate the apparatus even when it is necessary to clean the bath, simply by fitting a new lower part, while the previous one is cleaned.

LIST OF REFERENCES 1 fiber structure
3 stock
5 bath
7 comb
9 wiping roll pair
11 guide ring
13 spindle
15 component
21 lower part
23 cover
25 inclined surface
27 wiper
29 wiping edge
31 wiper
33 deflection unit
35 first deflection unit on the lower part 21
37 second deflection unit on the lower part 21
39 gap
41 second gap
43 wiping roll
45 first deflection unit mounted on the cover 23
47 second deflection unit mounted on the cover 23
49 additional deflection unit in the bath 5
51 deflection unit

The invention claimed is:

1. An apparatus for impregnating fiber structures with a matrix material, comprising a lower part having a bath for receiving the matrix material and a draining unit, wherein the draining unit comprises at least one wiper having a wiping edge, over which the impregnated fiber structure is guided during operation, and a surface inclined in the direction of the bath, by which matrix material draining from the fiber structure can return into the bath, as well as a cover, on which a deflection unit, by which the fiber structure is pressed into the bath when the cover is mounted, is mounted, a gap respectively being formed, when the cover is mounted, between the cover and the lower part on the sides by which the fiber structure is guided into the apparatus and emerges from the apparatus, wherein at least one wiper, which presses from above with a wiping edge on the impregnated fiber structure when the cover is mounted, is mounted on the cover.

2. The apparatus according to claim 1, wherein the wipers on the cover and on the lower part are arranged offset with respect to one another in the feed direction of the fiber structure.

3. The apparatus according to claim 2, wherein the wipers on the lower part and on the cover are respectively dimensioned in such a way that the wiping edge of the at least one wiper on the cover is lower than the wiping edge of the at least one wiper on the lower part of the apparatus.

4. The apparatus according to claim 1, wherein the wipers are respectively made of an abrasion-resistant metal, an abrasion-resistant plastic, ceramic or glass.

5. The apparatus according to claim 1, wherein a first deflection unit, over which the fiber structure is guided before entering the bath, is provided on the lower part.

6. The apparatus according to claim 1, wherein a second deflection unit, over which the impregnated fiber structure is guided after leaving the bath, is provided on the lower part.

7. The apparatus according to claim 6, wherein a wiping roll, which presses the fiber structure onto the second deflection unit when the cover is mounted, is mounted on the cover.

8. The apparatus according to claim 1, wherein a first deflection unit, over which the fiber structure is guided before entering the bath, is provided on the lower part and a second deflection unit, over which the impregnated fiber structure is guided after leaving the bath, is provided on the lower part, wherein the first deflection unit and the second deflection unit are respectively independently of one another a rod or a rotatable roller.

9. The apparatus according to claim 1, wherein a first deflection unit, over which the fiber structure is guided before entering the bath, is provided on the lower part and a second deflection unit, over which the impregnated fiber structure is guided after leaving the bath, is provided on the lower part, wherein the first deflection unit and the second deflection unit are respectively made independently of one another from an abrasion-resistant metal, an abrasion-resistant plastic, a ceramic or glass.

10. The apparatus according to claim 1, wherein a sealing lip is provided at the gap through which the fiber structure is guided into the apparatus and/or at the gap through which the fiber structure emerges from the apparatus.

11. The apparatus according to claim 1, wherein the deflection unit, by which the fiber structure is pressed into the bath, comprises at least one rod or at least one rotating roller.

12. The apparatus according to claim 1, wherein an inlet and an outlet for a flushing gas are provided.

13. The apparatus according to claim 1, wherein at least one of the at least one wiper mounted on the cover is height-adjustable.

14. A method for producing a fiber-reinforced component, comprising the following steps:
 (a) impregnating a fiber structure with a matrix material in an apparatus for impregnating fiber structures with a matrix material, the apparatus comprising a lower part having a bath for receiving the matrix material and a draining unit, wherein the draining unit comprises at least one wiper having a wiping edge, over which the impregnated fiber structure is guided during operation, and a surface inclined in the direction of the bath, by which matrix material draining from the fiber structure can return into the bath, as well as a cover, on which a deflection unit, by which the fiber structure is pressed into the bath when the cover is mounted, is mounted, a gap respectively being formed, when the cover is mounted, between the cover and the lower part on the sides by which the fiber structure is guided into the apparatus and emerges from the apparatus, wherein at least one wiper, which presses from above with a wiping edge on the impregnated fiber structure when the cover is mounted, is mounted on the cover, and
 (b) shaping the impregnated fiber structure to form the component.

15. The method according to claim 14, wherein the fiber structure comprises rovings.

16. The method according to claim 14, wherein the fiber structure contains carbon fibers, glass fibers or aramid fibers.

17. The method according to claim 14, wherein the matrix material is selected from unsaturated polyester resins, vinyl esters, epoxy resins and polyurethanes, and reagents thereof.

* * * * *